United States Patent
Yoshida et al.

(10) Patent No.: US 7,608,004 B2
(45) Date of Patent: Oct. 27, 2009

(54) DEAIRING TYPE HYDRAULIC TENSIONER

(75) Inventors: Osamu Yoshida, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 488 days.

(21) Appl. No.: 11/245,815

(22) Filed: Oct. 7, 2005

(65) Prior Publication Data

US 2007/0249444 A1   Oct. 25, 2007

(30) Foreign Application Priority Data

Nov. 22, 2004   (JP) .............................. 2004-337493

(51) Int. Cl.
*F16H 7/08* (2006.01)
(52) U.S. Cl. ...................... 474/110; 474/138
(58) Field of Classification Search .................. 474/110
See application file for complete search history.

(56) References Cited

U.S. PATENT DOCUMENTS

| 4,894,047 | A | * | 1/1990 | Breon et al. | 474/110 |
| 4,997,411 | A | * | 3/1991 | Breon et al. | 474/110 |
| 5,314,388 | A |   | 5/1994 | Suzuki et al. | |
| 5,993,342 | A | * | 11/1999 | Wigsten et al. | 474/110 |
| 6,193,623 | B1 | * | 2/2001 | Koch et al. | 474/110 |
| 6,203,461 | B1 |   | 3/2001 | Watanabe et al. | |
| 6,361,458 | B1 | * | 3/2002 | Smith | 474/109 |
| 6,398,682 | B1 | * | 6/2002 | Suzuki et al. | 474/110 |
| 6,435,993 | B1 | * | 8/2002 | Tada | 474/110 |
| 6,716,124 | B2 | * | 4/2004 | Markley | 474/110 |
| 2002/0022541 | A1 | * | 2/2002 | Ullein et al. | 474/110 |

FOREIGN PATENT DOCUMENTS

| EP | 1 101 975 A3 | 5/2001 |
| JP | 61890 | 1/1994 |
| JP | 11-336855 | 12/1999 |
| JP | 2001/146946 | 5/2001 |

* cited by examiner

*Primary Examiner*—Bradley T King
*Assistant Examiner*—Stephen Bowes
(74) *Attorney, Agent, or Firm*—Howson & Howson LLP

(57) ABSTRACT

In a hydraulic tensioner, a deairing valve unit, for releasing air mixed with oil in the high pressure oil chamber of the tensioner, comprises a check ball, a retainer, which envelops the check ball, but allows the check ball to move freely between an inflow end and an outflow end of a retainer passage, and a cylindrical ball seat press-fit into to a recess formed in a front end of the retainer. The deairing valve unit communicates with an exhaust vent formed in the front end of the plunger. A ball biasing spring is optionally provided to bias the check ball toward the ball seat.

2 Claims, 8 Drawing Sheets

DEAIRING TYPE HYDRAULIC TENSIONER

CROSS REFERENCE TO PRIORITY APPLICATIONS

This application claims priority on the basis of Japanese patent application 2004-337493, filed on Nov. 22, 2004. The disclosure of Japanese patent application 2004-337493 is hereby incorporated by reference.

FIELD OF THE INVENTION

This invention relates to hydraulic tensioners for applying proper tension to endless, flexible, traveling power transmission media, for example, timing belts or timing chains which transmit rotation between the crankshaft and one or more camshafts of an internal combustion engine. The invention relates more particularly to an improved deairing type hydraulic tensioner, in which air is vented from the high pressure oil chamber of the tensioner.

BACKGROUND OF THE INVENTION

Hydraulic tensioners are widely used to suppress backlash and vibration due to a changes in tension in timing belts and timing chains which transmit rotation from the crankshaft to one or more camshafts in a vehicle engine. A typical hydraulic tensioner comprises a plunger slidable in, and protruding from, a housing. The plunger and housing cooperate to provide a high pressure oil chamber into which oil is introduced through a ball-type check valve for blocking backflow of oil from the high pressure oil chamber.

FIG. 8 shows a conventional hydraulic tensioner 500. In the tensioner, a hollow, cylindrical, plunger 520 is slidable in, and protrudes from, a hole 511 in a housing 510, the plunger being biased in the protruding direction by a spring 530, which extends into the hole 521 formed in the interior of the plunger. The hole 521 of the plunger and the hole 511 of the housing, together constitute a high pressure oil chamber R, which receives oil under pressure from the engine's oil pump or another suitable source through a check valve unit 540, incorporated into the bottom of hole 511. The check valve unit allows oil to flow into the chamber R, but blocks backflow of oil. A typical hydraulic tensioner of the kind depicted in FIG. 8 is described in detail in U.S. Pat. No. 6,203,461.

The plunger is typically arranged to urge a pivoted guide against a traveling chain or other transmission medium to maintain tension therein.

Although the check valve unit 540, in the conventional hydraulic tensioner 500, can block backflow of oil from the high pressure oil chamber R, air can become mixed with the oil in the high pressure oil chamber. The compressibility of the air allows backlash and vibration of the traveling transmission medium, especially upon engine start-up.

Objects of the invention are to solve the above-mentioned problems, and to provide a deairing-type hydraulic tensioner, having a deairing valve unit which can suppress backlash and vibration due to the presence of air in the tensioner's high pressure oil chamber, and which effectively remove air from the interior of the tensioner housing during engine operation while maintaining a high pressure condition in oil chamber. It is also an object of the invention to provide a deairing valve unit that can be easily incorporated into the tensioner housing.

SUMMARY OF THE INVENTION

The deairing-type hydraulic tensioner according to the invention comprises a housing having a plunger-receiving hole with a bottom, a plunger, slidably disposed in the plunger-receiving hole and protruding therefrom, and having a protruding end for applying tension to an endless, flexible, traveling, power transmission medium. The plunger is hollow, and has an opening facing the bottom of the plunger-receiving hole, and an end wall adjacent its protruding end. The housing and plunger cooperate to form a high pressure oil chamber, part of which is composed of at least a part of the interior of the plunger, and part of which is composed of a part of the interior of the plunger-receiving hole. An exhaust vent is formed in the protruding end of the plunger, and a plunger-biasing means, preferably a coil spring, extends into the interior of the hollow plunger, and is disposed between the bottom of the plunger-receiving hole and the end wall of the plunger, urging the plunger in the protruding direction. A deairing valve unit, for releasing air from the high pressure oil chamber through the exhaust vent, is disposed inside the hollow plunger adjacent the protruding end thereof. The deairing valve unit comprises a retainer having a passage with an inflow end and an outflow end, a check ball disposed within the passage and freely movable therein toward and away from the outflow end, and a cylindrical ball seat fitting in a recess formed in the retainer adjacent the outflow end of the passage of the retainer. The ball seat has a passage communicating with the exhaust vent, and the check ball is engageable with the seat to block flow of oil from the oil chamber through the vent.

Preferably, the tensioner also comprises a check valve unit disposed within the plunger-receiving hole adjacent the bottom thereof, for blocking backflow of oil from the high pressure oil chamber.

In an alternative embodiment, a biasing spring is arranged to bias the check ball of the deairing valve unit toward the ball seat.

Backlash and fluttering due to excessive changes in tension of a timing belt, timing chain or the like, and particularly, backlash and fluttering due to the influence of air mixed with oil in the in a high pressure oil chamber at engine start-up are suppressed by the deairing valve unit. The deairing valve unit comprising the check ball, the retainer, and the cylindrical ball seat, can be easily incorporated into the front end of the without modifying other components of the tensioner. Where a minute clearance is provided between the retainer and the check ball, when the inside of the housing has been under a negative pressure, air, which has entered the housing can be easily exhausted through the exhaust vent in the front end of the plunger.

When the check ball in the deairing valve unit is urged by a biasing spring toward the front end of the plunger, if the plunger is pushed back, causing the pressure in the high pressure chamber to become excessive, outflow of oil from the housing to the outside of tensioner is blocked, so that the high pressure condition in the housing can be maintained. The biasing spring has a ball-engaging part that remains in direct contact with the ball both when the ball is in engagement with the ball seat and when the ball is out of engagement with the ball seat.

When a check valve unit is also provided at the bottom of the plunger-receiving hole of the housing to block the backflow of oil from the high pressure oil chamber, even if the plunger is rapidly moved backward by an excessive change in tension in the timing belt, timing chain or the like, the tensioner can resist the impact force without allowing backflow of oil.

The deairing valve unit of the invention can be incorporated into any of various kinds of hydraulic tensioners, including tensioners having a ratchet mechanism for limiting backward movement of the plunger.

The retainer is preferably made of metal, so that it can exhibit good endurance under the high temperature and high pressure conditions within the high pressure oil chamber.

DETAILED DESCRIPTION OF THE PREFERRED EMBODIMENTS

Figure 1:
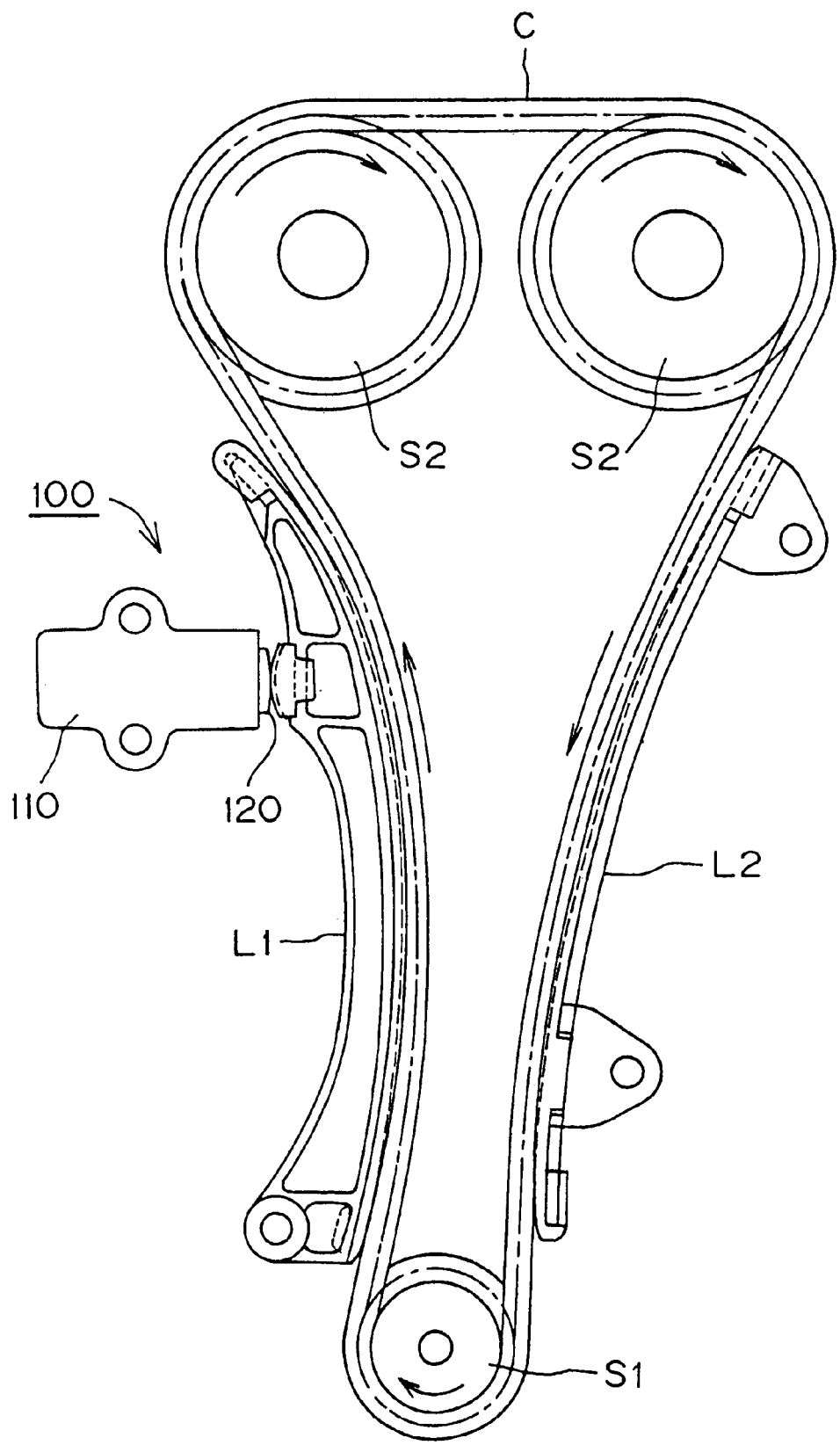
FIG. 1 is a schematic elevational view showing a deairing hydraulic tensioner used in the timing transmission of an internal combustion engine.

As shown in FIG. 1, a deairing type hydraulic tensioner 100 is attached to an engine (not shown) adjacent the slack side of a timing chain C arranged to transmit rotation from a driving sprocket S1 on the engine crankshaft to a pair of driven sprockets S2 on the engine camshafts. A cylindrical plunger 120 slidably protrudes from the tensioner housing 110 and applies tension to the slack side of the chain C through a pivoted tensioner lever L1 by pressing against the back of the lever at a location remote from the lever's pivot axis. A fixed guide L2 guides the travel of the tension side of chain C. Arrows in FIG. 1 indicate the direction of rotation of the sprockets, and the direction of travel of the chain.

Figure 2:
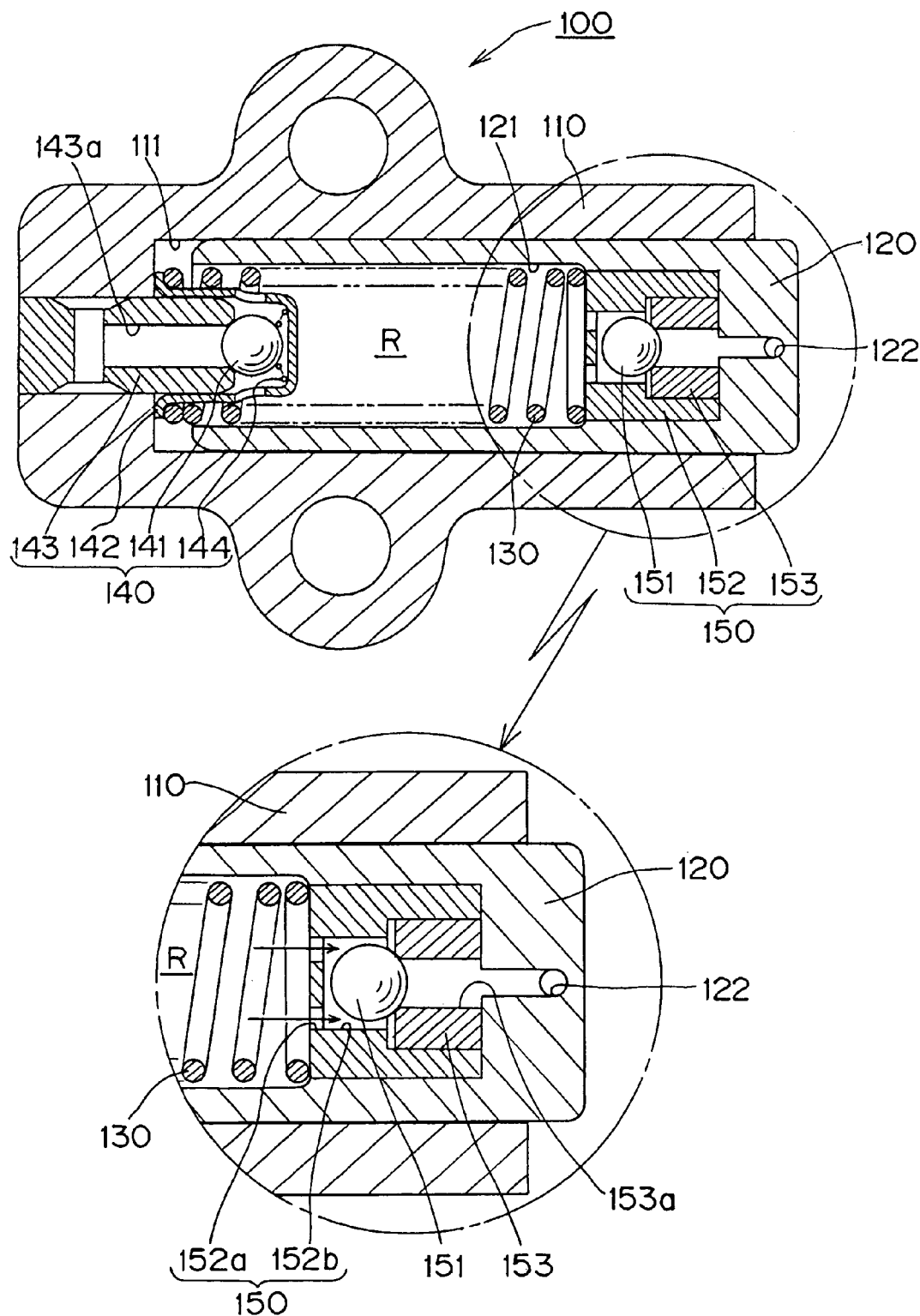
FIG. 2 is a cross-sectional view of the deairing hydraulic tensioner shown in FIG. 1, including an enlarged sectional view of the deairing valve unit.

In the tensioner 100, shown in FIG. 2, the plunger 120, which is hollow, having an interior hole 121, fits slidably into a plunger-receiving hole 111 in the tensioner housing 110. A high pressure oil chamber R is formed in part by the hole 111 of the housing and in part by the hole 121 in the plunger. A plunger-biasing coil spring 130, which extends into the interior of the plunger, urges the plunger 120 in the protruding direction.

A check valve unit 140 is incorporated into the tensioner at the bottom of the plunger-receiving hole 111. The check valve unit 140 allows oil to flow under pressure, from an oil pump or other suitable source, into the high pressure oil chamber R, but blocks backflow of oil out of the high pressure oil chamber.

Check valve unit 140 is an assembly composed of a check ball 141, a metal retainer 142, a cylindrical metal ball seat 143, and a ball-biasing spring 144. The ball seat 143 is press-fit into a hole formed in the bottom wall of the hole 111, and extends into the high pressure oil chamber, being surrounded by a part of the retainer 142. The retainer envelops the check ball 141, allowing a limited amount of movement of the ball toward and away from the seat 143. The ball-biasing spring 144, urges the check ball 141 toward the seat 143.

A deairing valve unit 150 is incorporated into the plunger at the bottom of the interior hole 121 of the plunger. The purpose of the deairing valve unit is to remove air, from the high pressure oil chamber R, through an exhaust vent 122 formed in the front end of the plunger.

As shown in the enlargement in FIG. 2, the deairing valve unit is an assembly composed of a check ball 151, a metal retainer 152, and a cylindrical ball seat 153, which fits securely into a recess formed in the retainer 152. The check ball 151 functions to release air, mixed with oil, from the high pressure oil chamber R but blocks outflow of oil so that pressure can be maintained in chamber R. Retainer 152, envelops the check ball 151, allowing the check ball 151 to move freely, within a limited range in guide hole 152b of the retainer, toward and away from the ball seat 153.

Holes 152a are provided in the retainer 152 for flow of air mixed with oil from the high pressure oil chamber R into the deairing valve unit. Air is released through hole 153a in the ball seat 153 and through an exhaust vent 122 formed adjacent the front end of the plunger.

The cylindrical ball seat 153 is secured to the retainer 152, preferably by press-fitting, at the time of assembly of the deairing valve unit 150. Thereafter, the retainer 152 is inserted into the plunger, and press-fit into a bottom portion of hole 121. Because the retainer 152 is composed of metal, it can exhibit high endurance at the temperatures and pressures to which it is exposed in operation.

The front end of the plunger-biasing spring 130 reliably abuts the retainer 152, and the plunger spring 130 can expand smoothly without abnormal contact with the inside wall of the plunger. Consequently wear and contact noise due to abnormal contact between the spring and the interior wall of the plunger can be avoided.

As will be apparent from FIG. 2, one end of coil spring 130 abuts a flange formed on retainer 142 of the check valve unit 140, and the other end of spring 130 abuts a face of retainer 152 of the deairing valve unit. Even if the plunger is moved backward rapidly as a result of excessive tension, the elastic force of the spring resists the backward movement of the plunger, so that backlash and variation in tension of the timing belt, timing chain, or like, is suppressed. Stable deairing takes place as a result of the flow of air mixed with oil along the path depicted by arrows in the enlarged view of FIG. 3.

The check ball 151 may be composed of metal, ceramic or a synthetic resin, and has a diameter such that it can move in the metal retainer 152.

In the operation of the deairing type hydraulic tensioner 100, the high pressure oil chamber R is always filled with oil supplied, through the check valve unit 140, from an outside source such as an oil pump or the like. When the timing chain C (FIG. 1) loosens, the plunger 120, which is continuously biased in the protruding direction by plunger-biasing spring 130, moves forward, and, as the plunger moves forward, the check valve unit 140 opens to allow oil to flow into the high pressure oil chamber R.

When the plunger 120 is moved backward into the plunger-receiving hole 111 of the housing 110 by being pressed by an impact force from a timing chain C, acting against the biasing force exerted by spring 130, the pressure of the oil in the high pressure oil chamber R is increased, and the check ball 141 of the check valve unit 140 is pushed onto the cylindrical ball seat 143. Consequently, backflow of oil from the high pressure oil chamber R through the oil passage 143a of the ball seat 143 is blocked. As a result, the oil pressure in the high pressure oil chamber R is further increased, and oil leaks through a slight clearance between the outer circumferential surface of the plunger 120 and the inner circumferential surface of the plunger-receiving hole 111. The leaking oil is discharged to the outside of the housing 110. The impact force, which acts on the plunger 120 is absorbed by flow resistance due to the viscosity of oil, and vibration of the plunger 120 due to the impact is rapidly damped. Therefore, backlash and vibration due to excessive tension in a timing belt, timing chain or the like can be suppressed. Additionally, the deairing unit 150 can be easily and securely incorporated into the front end of the interior of the plunger as a simple integrated unit, without modifying other components of the tensioner. A minute clearance is provided between the check ball 151 and the retainer 152. When the inside of the housing 110 has been in a negative pressure condition, air, which has entered the housing 110 is easily removed by passing through the clearance between the ball 151 and the retainer 152, and though the ball seat 153 and exhaust vent 122.

The manner in which deairing takes place in the deairing valve is explained more particularly as follows.

Upon engine start-up, especially after the engine has been stopped for a long time, much of the oil inside the tensioner 100 will have leaked out of the tensioner, and will have been displaced by air. Upon engine start-up, while the pressure of the oil supplied to the tensioner is still low, the plunger 120 of the tensioner moves forward with a relatively large stroke, under the urging of the plunger-biasing spring 130. The forward movement of the plunger generates a negative pressure inside the high pressure oil chamber R. Upon engine start-up, when the stroke of the plunger is large, a relatively large negative pressure will be generated inside the tensioner.

When the pressure inside the tensioner becomes negative as the plunger slides forward, the check ball 151 of the deairing valve unit 150 separates from the ball seat 153. At this time, a small amount of air can flow, though the deairing check valve, into the high pressure oil chamber. However, the amount of air flowing into the chamber is very limited because, at the same time, oil from the oil supply is entering the tensioner under pressure through the oil supply check valve unit 140 at the opposite end of the high pressure oil chamber. Thereafter, whether as a result of retracting movement of the plunger, or as a result of the entry of oil from the oil supply into the chamber, the pressure inside the chamber rises, and the check ball of the deairing valve moves toward its seat. A mixture of oil and air from inside the high pressure chamber is discharged through the deairing valve while the ball is moving toward its seat. In other words, the deairing valve opens momentarily during engine start-up, and air is discharged, along with oil, while the deairing valve is closing. Additional amounts of the mixture of air and oil are discharged through the small clearance between the plunger and the wall of the plunger-receiving hole of the housing.

A negative pressure can be generated in a similar manner during normal engine operation. However, in this case, because most of the oil supply to the tensioner will have been restored, the negative pressure will be smaller than at engine start-up. The de-airing check ball will open only by a relatively small amount in this case, but will continually discharge small amounts of the air-oil mixture inside the tensioner, and thereby maintain the oil inside the tensioner in a substantially incompressible condition, to minimize vibration and fluttering of the traveling transmission medium in which tension is being maintained.

Figure 3:
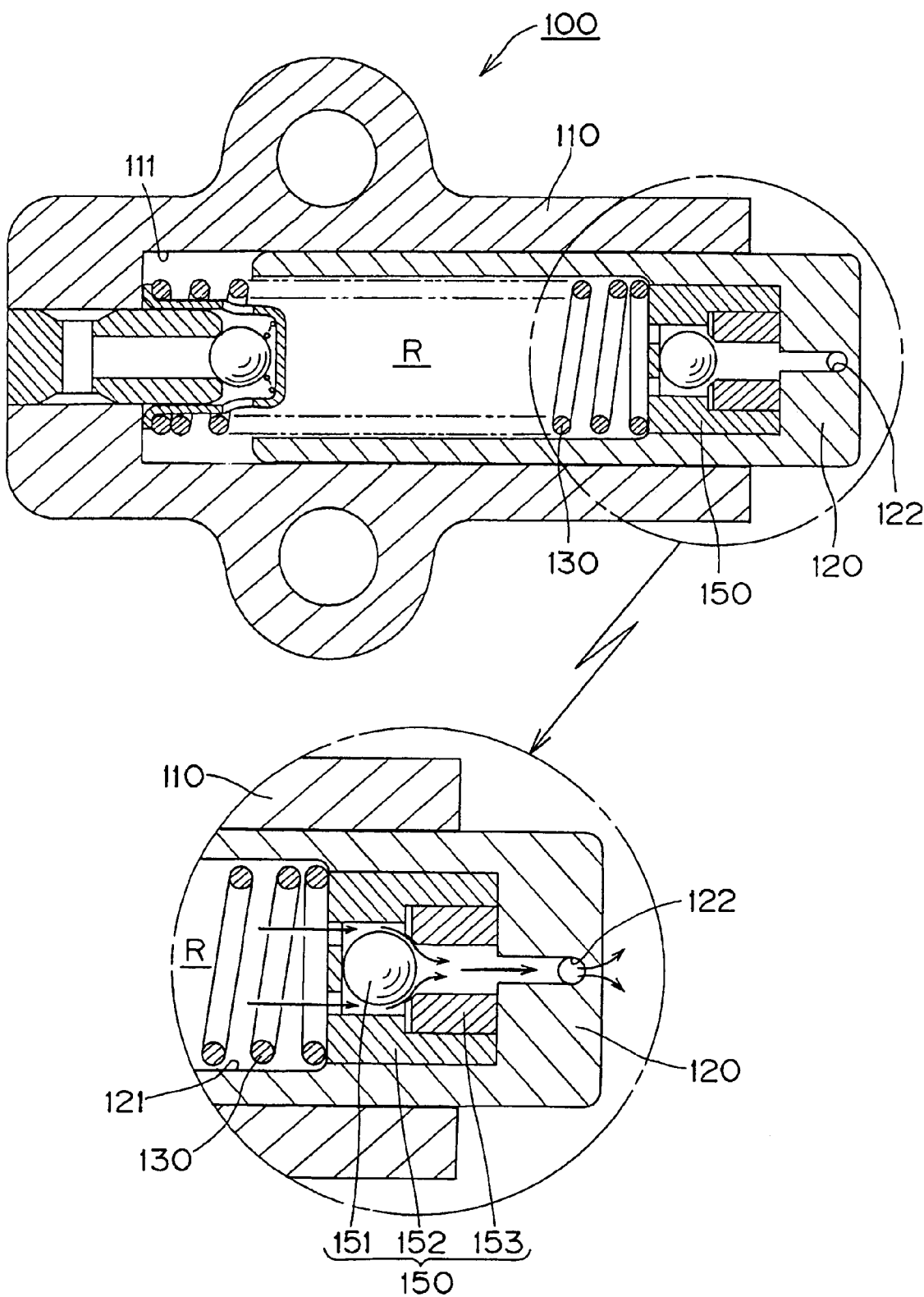
FIG. 3 is a cross-sectional view of the tensioner of FIG. 2, including an enlarged sectional view illustrating the operation of the deairing valve unit.
Figure 4:
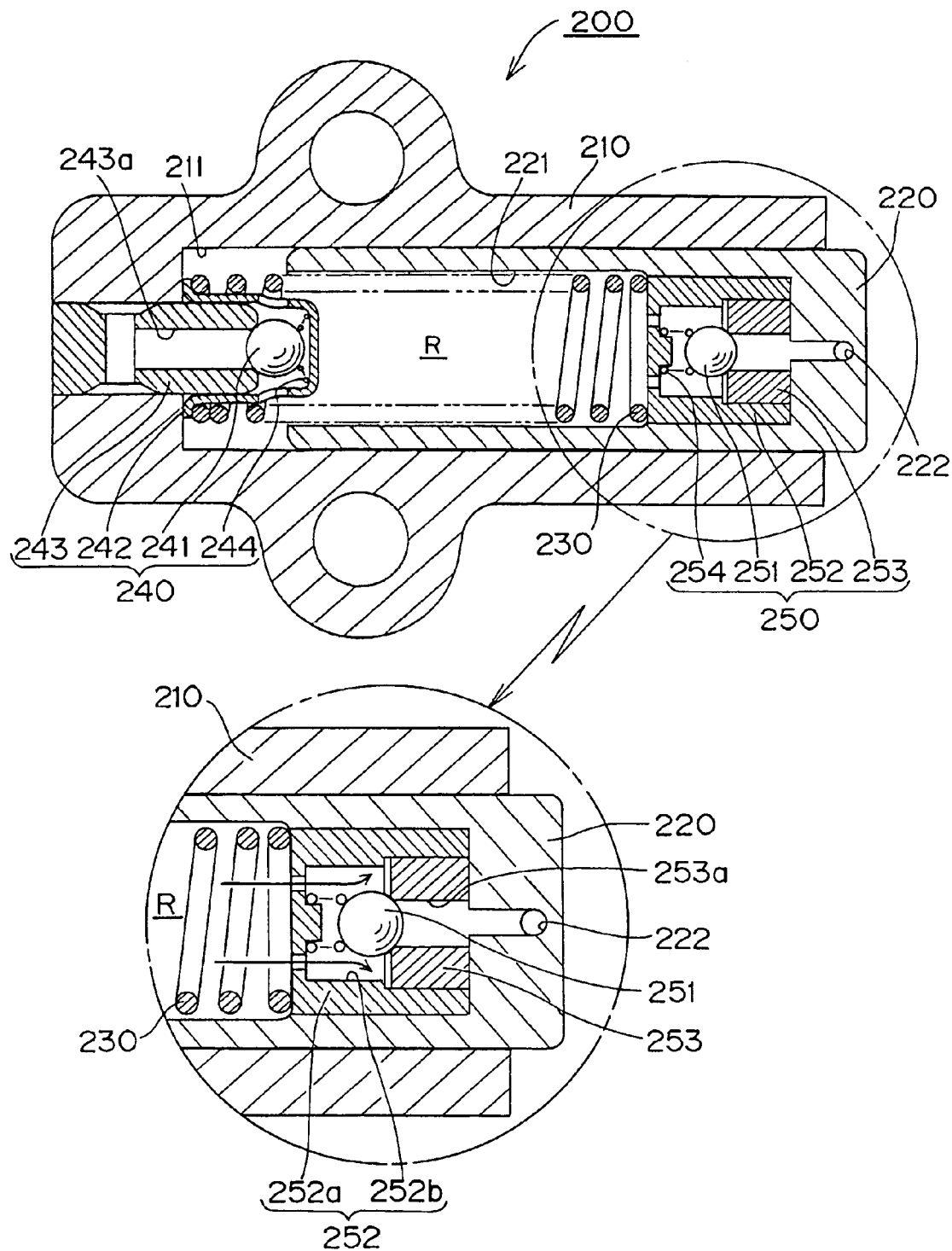
FIG. 4 is a cross-sectional view of a second embodiment of a deairing hydraulic tensioner according to the invention, including an enlarged sectional view of the deairing valve unit.

The deairing hydraulic tensioner 200, shown in FIG. 4, is different from the deairing hydraulic tensioner 100 in that it includes a ball-biasing spring 254, which urges check ball 251 toward a ball seat 253 in a deairing valve unit 250. Otherwise, the configuration of the hydraulic tensioner 200 is substantially the same as that of hydraulic tensioner 100. In FIGS. 4 to 7 parts corresponding to those of the embodiment in FIGS. 2 and 3 are designated by corresponding reference numerals in the two hundred series. Arrows in the enlarged view of FIG. 6 show the flow of air through the deairing valve unit 250.

Figure 5:
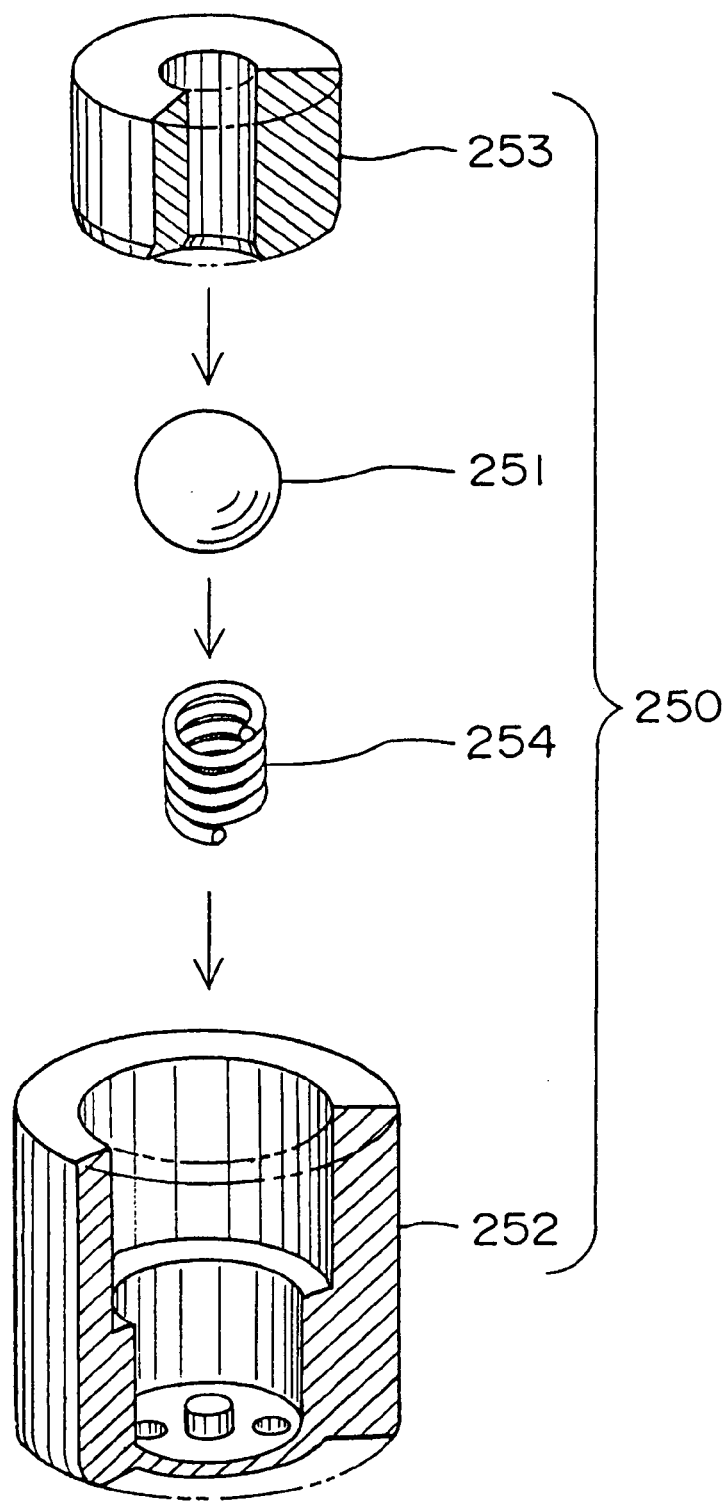
FIG. 5 is an exploded view of the deairing valve unit of the tensioner of FIG. 4.
Figure 6:
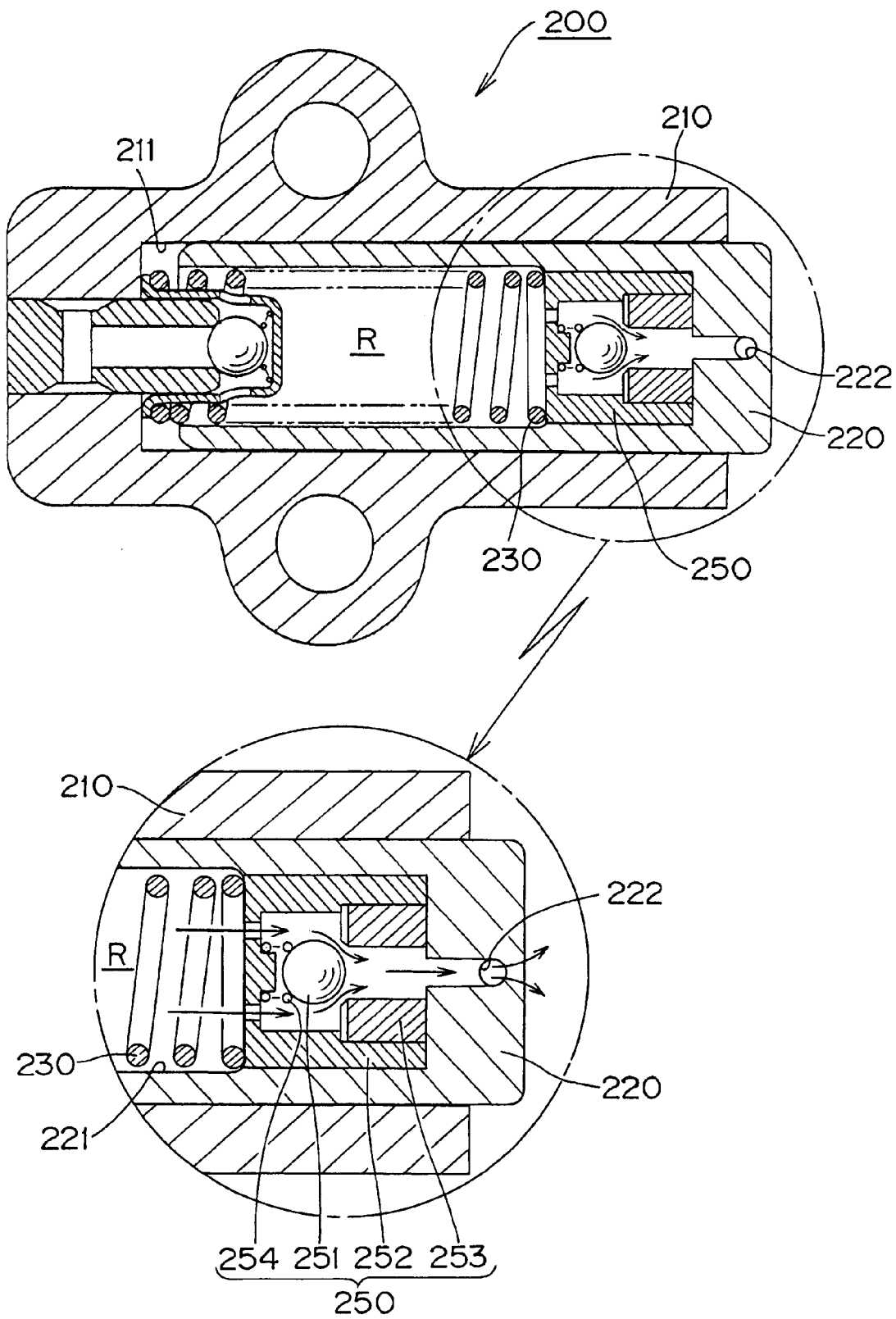
FIG. 6 is a cross-sectional view of the tensioner of FIG. 4, including an enlarged sectional view illustrating the operation of the deairing valve unit.
Figure 7:
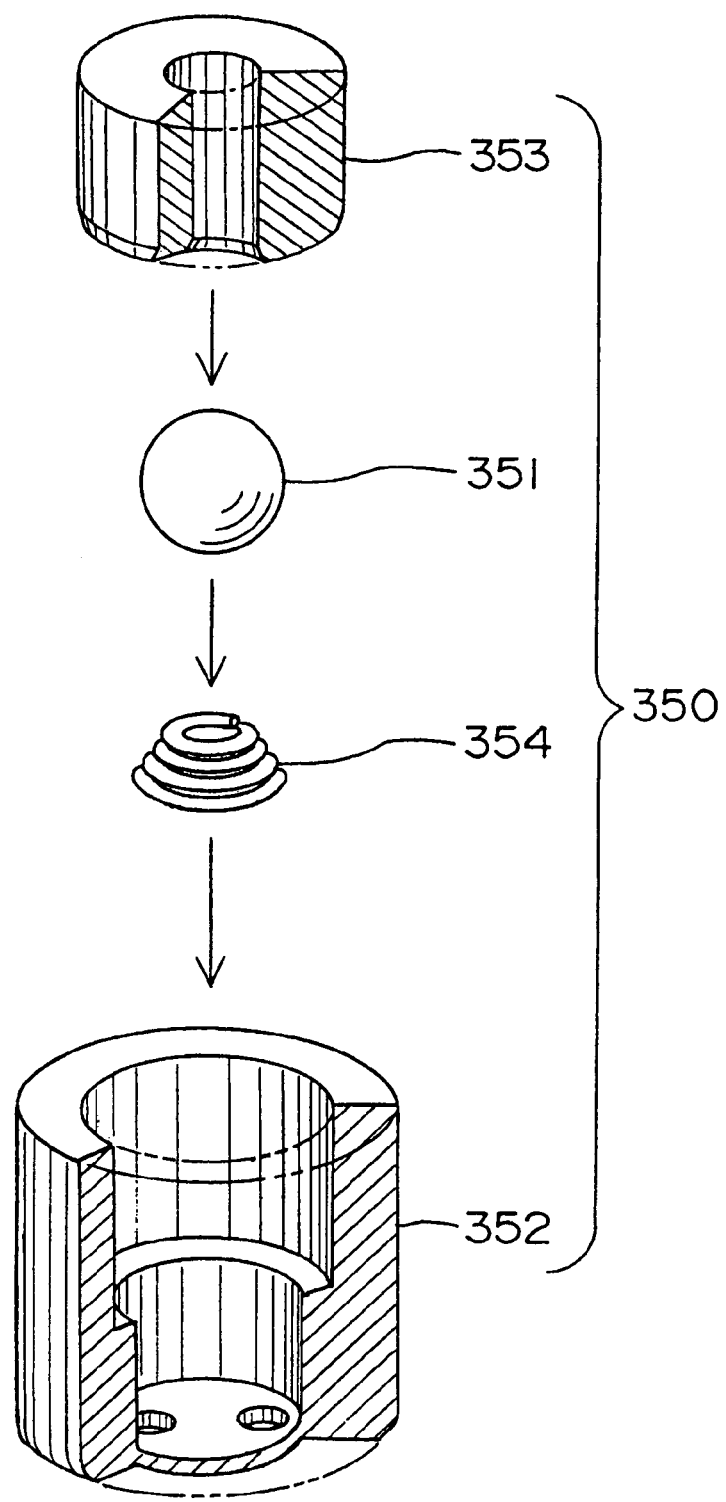
FIG. 7 is an exploded view showing a modified version of the deairing valve unit of FIG. 5.
Figure 8:
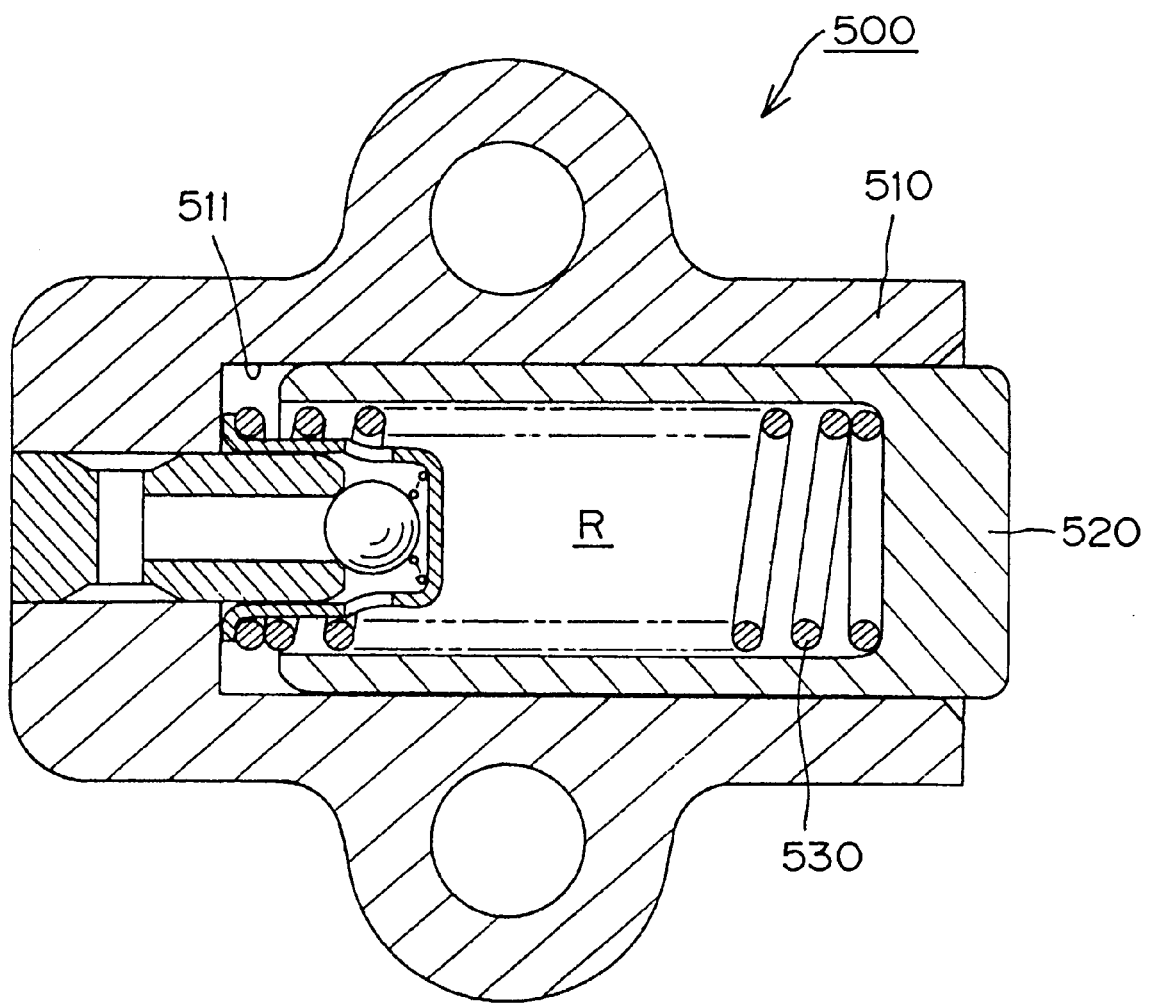
FIG. 8 is a cross-sectional view of a conventional hydraulic tensioner.

A coil spring is used as the ball-biasing spring 254 in the second embodiment, and is supported by a protrusion as seen in FIGS. 4, 5 and 6. However, if a conical ball biasing spring 354, as shown in FIG. 7, is adopted, it is not necessary to provide a protrusion.

As in the case of the first embodiment, in the second embodiment, in which a coil spring is used to bias the check ball of the deairing valve unit, backlash and fluttering of the timing chain or belt are significantly suppressed and the deairing action takes place in a stable manner. The biasing spring 254 has a ball-engaging oart that remains in direct contact with the ball 251 both when the ball is in engagement with the ball seat 253 as shown in FIG. 4, and when the ball is out of engagement with the ball seat as shown in FIG. 6.

The ball-biasing spring 254 maintains high pressure in the housing 210 by ensuring that outflow of oil from the housing 210 is blocked. As shown in the enlargement of FIG. 6, only when the inside of the housing 210 has been in a negative pressure state, can air, which had entered the housing, be exhausted through exhaust vent 222. In particular, the deairing hydraulic tensioner 200 of the second embodiment can prevent air suction into the high pressure oil chamber R due to mechanical vibration.

We claim:

1. A deairing hydraulic tensioner comprising:
a housing having a plunger-receiving hole with a bottom;
a plunger slidably disposed in the plunger-receiving hole and protruding therefrom, and having a protruding end for applying tension to an endless, flexible, traveling power transmission medium, said plunger being hollow and having an opening facing the bottom of the plunger-receiving hole, and an end wall adjacent said protruding end, said housing and said plunger cooperating to form a high pressure oil chamber part of which is composed of at least a part of the interior of the plunger, and part of which is composed of a part of the interior of the plunger-receiving hole, and an exhaust vent formed in said protruding end of the plunger;
a plunger-biasing means extending into the interior of the hollow plunger, and disposed between said bottom of the plunger-receiving hole and said end wall of the plunger, said plunger-biasing means urging the plunger in the protruding direction; and
a deairing valve unit for releasing air from said high pressure oil chamber through said exhaust vent, said deairing valve unit being disposed inside said hollow plunger adjacent the protruding end thereof;
wherein said deairing valve unit comprises a check ball retainer having an internal passage arranged to provide fluid communication between said high pressure oil chamber and said exhaust vent, said internal passage having an inflow opening at one end thereof, through which fluid can flow from said high pressure oil chamber into said internal passage and from said internal passage into the high pressure oil chamber, and an opposite end, the internal passage extending from said inflow opening to said opposite end, a cylindrical ball seat fitting in a recess formed in said check ball retainer adjacent the opposite end of said internal passage, the ball seat having a through hole providing fluid communication between said internal passage of the check ball retainer and said exhaust vent, and a check ball disposed within said internal passage of the check ball retainer and movable therein toward and away from the ball seat by differences between the fluid pressure in the high pressure oil chamber and external fluid pressure, the check ball being engageable with said ball seat and positioned in relation to the ball seat so that increased pressure within the high pressure oil chamber urges the check ball more tightly against the ball seat, whereby the check ball and ball seat can block flow of oil from said oil chamber through said exhaust vent; and including a biasing spring arranged to bias the check ball toward, and into seating engagement with, the ball seat, said biasing spring being located within the internal passage of the retainer and having a ball-engaging part in direct contact with the ball, and said ball being located between the biasing spring and the exhaust vent, and said ball-engaging part being in direct contact with the ball when the ball is in engagement with the ball seat and also when the ball is out of engagement with the ball seat.

2. A deairing hydraulic tensioner according to claim 1, also comprising a check valve unit disposed within the plunger-receiving hole adjacent the bottom thereof, for blocking backflow of oil from said high pressure oil chamber.

\* \* \* \* \*